(12) United States Patent
Ehrich et al.

(10) Patent No.: US 7,249,148 B2
(45) Date of Patent: Jul. 24, 2007

(54) SYSTEM AND METHOD FOR ADAPTIVE USER SETTINGS

(75) Inventors: Nathanael Ferguson Ehrich, Raleigh, NC (US); Robert Charles Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 10/782,523

(22) Filed: Feb. 19, 2004

(65) Prior Publication Data

US 2005/0187945 A1      Aug. 25, 2005

(51) Int. Cl.
*G06F 17/00* (2006.01)
*G06F 7/00* (2006.01)

(52) U.S. Cl. .................................. 707/104.1; 707/10
(58) Field of Classification Search ............ 707/104.1, 707/10; 709/227, 217
See application file for complete search history.

(56) References Cited

U.S. PATENT DOCUMENTS

| | | | | |
|---|---|---|---|---|
| 5,896,321 | A | 4/1999 | Miller et al. | 365/189.01 |
| 5,977,964 | A | 11/1999 | Williams et al. | 345/327 |
| 7,027,997 | B1* | 4/2006 | Robinson et al. | 705/9 |
| 2001/0016906 | A1 | 8/2001 | Brebner | 713/150 |
| 2001/0051978 | A1 | 12/2001 | Allen et al. | 709/229 |
| 2002/0054090 | A1 | 5/2002 | Silva et al. | 345/747 |
| 2002/0063735 | A1 | 5/2002 | Tamir et al. | 345/745 |
| 2002/0065920 | A1 | 5/2002 | Siegel et al. | 709/227 |
| 2002/0138331 | A1 | 9/2002 | Hosea et al. | 705/10 |
| 2002/0152237 | A1 | 10/2002 | Cohen et al. | 707/513 |
| 2002/0188694 | A1 | 12/2002 | Yu | 709/218 |
| 2003/0053420 | A1* | 3/2003 | Duckett et al. | 370/252 |
| 2003/0065638 | A1 | 4/2003 | Robert | 707/1 |
| 2003/0074660 | A1 | 4/2003 | McCormack et al. | 725/2 |
| 2003/0120472 | A1* | 6/2003 | Lind | 703/13 |
| 2003/0154277 | A1* | 8/2003 | Haddad et al. | 709/224 |
| 2004/0148351 | A1* | 7/2004 | Cotte | 709/205 |
| 2005/0097190 | A1* | 5/2005 | Abdelhak | 709/217 |
| 2005/0198300 | A1* | 9/2005 | Gong et al. | 709/227 |

FOREIGN PATENT DOCUMENTS

TW      1178410      6/2002

* cited by examiner

*Primary Examiner*—John Cottingham
*Assistant Examiner*—Kuen S. Lu
(74) *Attorney, Agent, or Firm*—VanLeeuwen & VanLeeuwen; David Irvin

(57) ABSTRACT

A system and method for adaptive user settings is presented. A server sends a requested web page and a collector program to a client. The collector program non-invasively collects user event data, and sends the user event data to the server. In turn, the server analyzes the user event data, and identifies configuration preferences, such as a scrolling preference, a tabbing preference, or an arrangement preference. The server sends an inquiry to the client's user that includes one or more questions as to whether the server should save particular configuration preferences. After receipt of an acknowledgement, the server either saves the configuration preferences locally, or sends the configuration preferences to the client. During subsequent same-page requests, the server uses the configuration preferences to customize the view of the web page.

14 Claims, 9 Drawing Sheets

SYSTEM AND METHOD FOR ADAPTIVE USER SETTINGS

BACKGROUND OF THE INVENTION

1. Technical Field

The present invention relates in general to a system and method for adaptive user settings. More particularly, the present invention relates to a system and method for non-invasively collecting user configuration preferences and customizing a page of data based upon the user configuration preferences.

2. Description of the Related Art

The Internet has changed the way that a business attracts and retains a customer. In many cases, a customer's exposure to a particular business is solely through the business' website. In this situation, the business' website is the business' most important asset for establishing customer confidence and loyalty.

With that said, a business attempts to organize its website by displaying items that are most interesting to a customer on its home page such that a customer is not required to click through multiple layers in order to view the items. For example, a customer may be interested in a popular children's toy and if the customer does not see a link to the toy on the business' home page, the customer may not spend time "clicking" through the business' website in order to find the toy. Rather, the customer may visit another business' homepage that displays the toy on its home page.

A challenge found, however, is that it may not be apparent to a business as to which items are of most interest to its customers and, in fact, items of interest may be different for each customer. For example, a user that visits a sports website may select a tab corresponding to his favorite team. In this example, it is difficult for the website administrator to determine which "tab" should be displayed first since each user's favorite team may be different. Also in this example, each user may wish to scroll to a particular section of a web page based upon his interest, such as a team's history, a team's current league standings, or a team's player statistics, each of which may be located at a different area of a web page.

Furthermore, when a user visits a particular web page, the user may wish to view the same area within the web page at subsequent visits. A challenge found, however, is displaying a web page that is customized for a particular user based upon previous visits without requiring human interaction at either the customer's client or at the server that is hosting the web page.

What is needed, therefore, is a system and method to non-invasively collect a user's web page viewing preferences and use the collected viewing preferences to provide a user with a customized web page view upon subsequent visits.

SUMMARY

It has been discovered that the aforementioned challenges are resolved by non-invasively collecting user event data, generating configuration preferences based upon the user event data, and using the configuration preferences for subsequent page requests to customize a web page's view. A user uses a client to request a page of data from a server, such as a web page. The server receives the page of data request, and retrieves the requested web page along with a data collector program that is used to non-invasively collect user event data at the client.

The server sends the page of data and the collector program to the client through a computer network, such as the Internet. The client receives the page of data and the collector program, displays the page of data on its display, and loads the collector program that, in turn, initiates particular event handlers. The event handlers monitor and track user events (i.e. mouse movements, keystrokes, etc.) at the client based upon criteria that is included in the collector program.

When the collector program identifies a valid user event, the collector program collects data until the user event is complete. For example, the user may have moved his pointing device over a particular region and kept his pointing device in the region for thirty seconds. The collector program formats the user event data, and sends the user event data to the server through the computer network.

As one skilled in the art can appreciate, user event data may be non-invasively sent to a server using a technique such as creating an image object and composing a URL which is set as the source attribute of the image object. Using this technique, user event data is included in the URL's query string that is sent to a server when the client silently requests the URL. The server returns an image, which may be of varying size as determined by the server. The size of the image may be used to indicate a response message (i.e. returning a 1 pixel×1 pixel image indicates successful transmission, 2 px×2 px image indicates server overflow, etc.).

The server analyzes the user event data, and identifies one or more configuration preferences, such as a scrolling preference, a tabbing preference, and an arrangement preference. For example, the server may identify that the user selected a particular tab, and scrolled down the web page to a particular area. The server sends a configuration preferences storage inquiry to the client that includes one or more questions for the user to answer as to whether it wishes the server to store the identified configuration preferences. For example, the configuration preferences storage inquiry may include the question "Would you like the tab order automatically arranged in this manner at subsequent visits?" In another example whereby a user scrolls to a particular section of a web page, the configuration preferences storage inquiry may include the question "Would you like to automatically view this portion of the web page at subsequent visits?"

The user answers the questions included in the configuration preferences storage inquiry, and the client sends a storage response to the server. In order to determine whether to store the configuration preferences locally or send the configuration preferences to the client, the server identifies whether it is involved in a user session with the client. If the server is involved in a user session, the server stores configuration preferences in a local storage area. On the other hand, if the server is not involved in a user session, the server sends the configuration preferences to the client to store (i.e. a cookie.

When the user performs subsequent requests for the same page of data, the server uses the configuration preferences to configure the requested web page. If the server is involved in a user session with the client, the server retrieves the configuration preferences from its local storage area. On the other hand, if the server is not involved in a user session with the client, the server receives the configuration preferences from the client and uses the received configuration preferences to configure the requested web page. Once configured, the server sends the customized web page to the client for the client's user to view.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
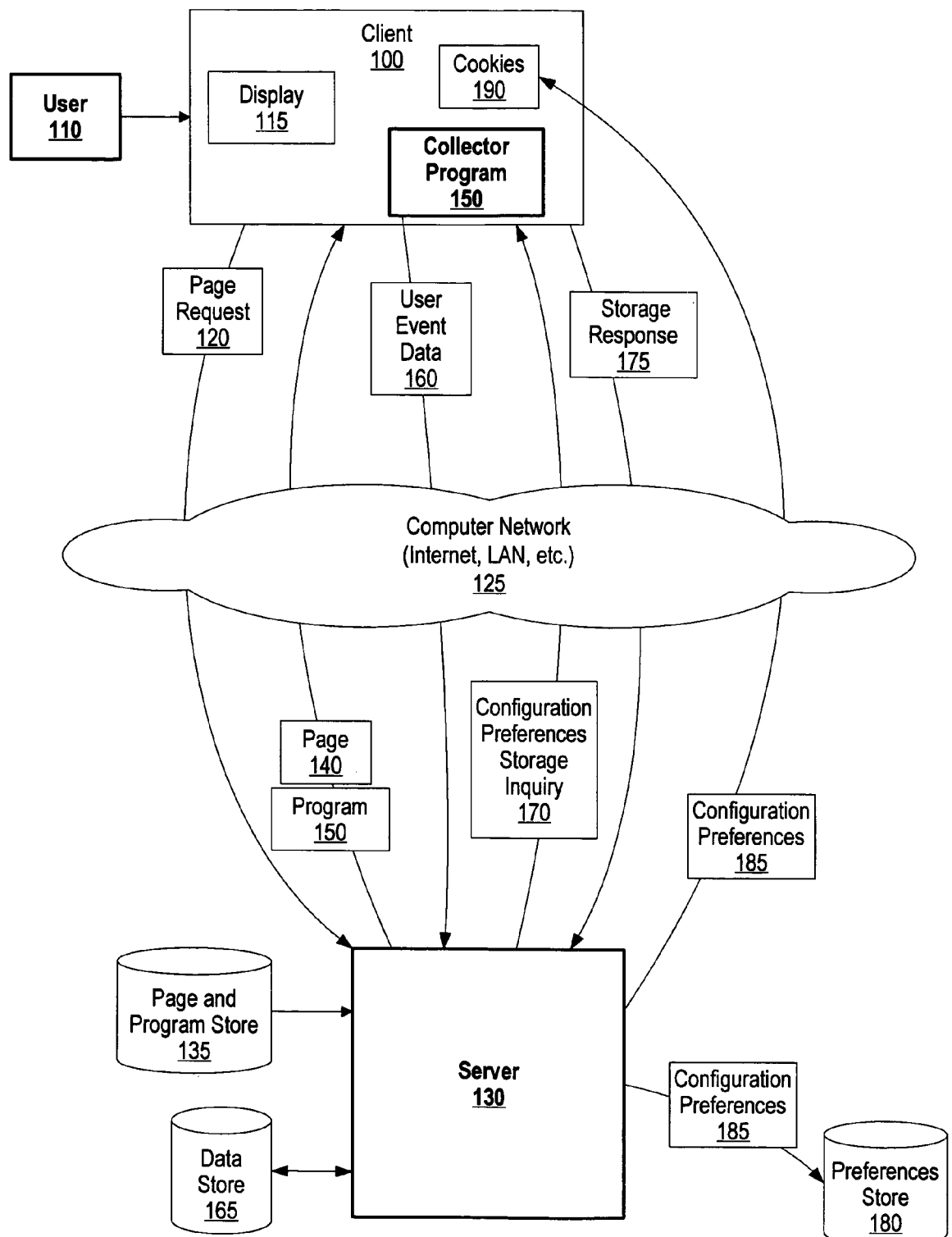
FIG. 1 is a diagram showing a server receiving non-invasive data from a client and setting configuration preferences corresponding to the client's user and a page of data.

FIG. 1 is a diagram showing a server receiving non-invasive data from a client and setting configuration preferences corresponding to the client's user and a page of data. User 110 uses client 100 to request a page of data from server 130, such as a web page. Client 100 includes display 115 which displays the particular web page. When user 110 wishes to view a web page, client 100 sends page request 120 to server 130 through computer network 125, such as the Internet. For example, user 110 may wish to view his Yahoo home page.

Server 130 receives page request 120 and retrieves the requested web page and a data collection program from page and program store 135. The data collection program is used to non-invasively collect user event data at client 100 and send the user event data to server 130. Page and program store 135 may be stored on a non-volatile storage area, such as a computer hard drive.

Server 130 sends page 140 and program 150 to client 100 through computer network 125. Client 100 receives page 140 and program 150, and displays page 140 on display 115 for user 110 to view. Client 100 also loads program 150 which initiates particular event handlers. The event handlers monitor and track user events at client 100 based upon criteria that is included in program 150.

When user 110 uses his pointing device to move around the web page, or his keyboard to enter or select information on the web page, collector program 150 identifies the user event and proceeds through a series of steps to determine whether to send corresponding user event data to server 130. Collector program 150 is interested in user events that occur within the web page, such as mouse movements within regions, scrolling activity, and tab selections (see FIGS. 6, 7, and corresponding text for further details regarding data collection).

When collector program 150 identifies a valid user event, collector program 150 collects data until the user event is complete. For example, user 110 may have moved his pointing device over a particular region and left his pointing device in the region for thirty seconds. Collector program 150 formats the user event data, and sends user event data 160 to server 130 through computer network 125. Server 130 receives user event data 160 and stores it in data store 165. Data store 165 may be stored on a non-volatile storage area, such as a computer hard drive.

As one skilled in the art can appreciate, user event data may be non-invasively sent to a server using a technique such as creating an image object and composing a URL which is set as the source attribute of the image object. Using this technique, user event data is included in the URL's query string which is sent to a server when the client silently requests the URL. The server returns an image which may be of varying size as determined by the server. The size of the image may be used to indicate a response message (i.e. returning a 1 pixel×1 pixel image indicates successful transmission, 2 px ×2 px image indicates server overflow, etc.).

Server 130 analyzes the user event data, and identifies one or more configuration preferences. For example, server 130 may identify that user 110 selected a particular tab, and scrolled down the web page to a particular area. Server 130 sends configuration preferences storage inquiry 170 to client 100 that includes one or more questions for user 110 to answer as to whether it wishes server 130 to store the identified configuration preferences. For example, configuration preferences storage inquiry 170 may include the question "Would you like us to re-arrange the tab order of the panes/layers you are viewing so that the second pane is the first one visible?" In another example whereby a user scrolls to a particular section of a web page, configuration preferences storage inquiry 170 may include the question "Would you like us to remember your scrolling preference so that your selected area is automatically displayed after every page request?"

User 110 answers the questions included in configuration preferences storage inquiry 170, and client 100 sends storage response 175 to server 130 through computer network 125. In order to determine whether to store the configuration preferences locally or send the configuration preferences to client 100 to store, server 130 identifies whether it is involved in a user session with client 100. If server 130 is involved in a user session, server 130 stores configuration preferences 185 in a local storage area, such as preferences store 180. On the other hand, if server 130 is not involved in a user session, server 130 sends configuration preferences 185 to client 100 to store, such as a cookie, to store in cookies 190.

Figure 2A:
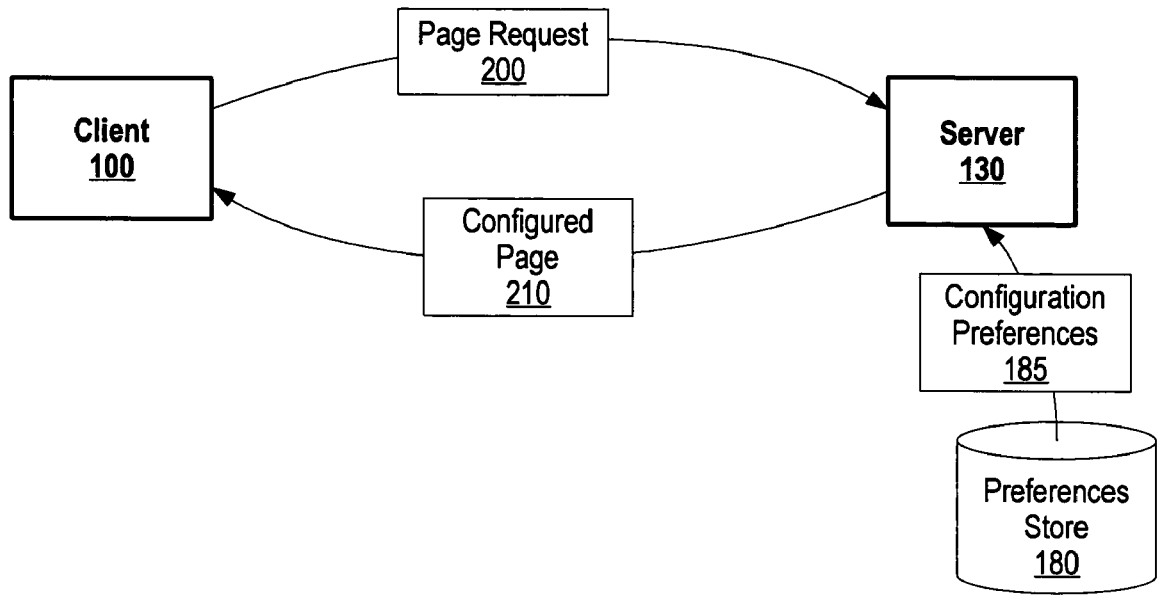
FIG. 2A is a diagram of a server receiving a page request from a client during a user session, and sending a configured page to the client using locally stored configuration preferences.
Figure 2B:
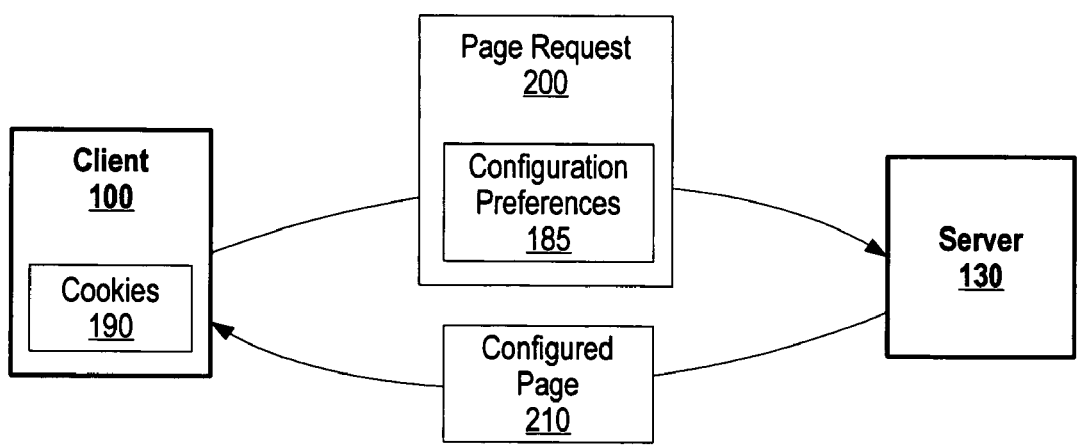
FIG. 2B is a diagram of a server receiving a page request and configuration preferences from a client, and sending a configured page to the client using the received configuration preferences.

When user 110 performs subsequent requests for the same page of data, server 130 configures the page of data using configuration preferences 185, and sends a configured page of data for user 110 to view (see FIGS. 2A, 2B, and corresponding text for further details regarding subsequent page requests).

FIG. 2A is a diagram of a server receiving a page request from a client during a user session, and sending a configured page to the client using locally stored configuration preferences. Client 100's user previously requested the same page of data whereby server 130 collected user event data, and stored configuration preferences corresponding to the user event data in a local storage area (e.g. preferences store 180) (see FIG. 1 and corresponding text for further details regarding configuration preferences storage details).

Client 100 sends page request 200 to server 130. Since client 100 and server 130 are involved in a user session, server 130 is able to identify client 100's user. Server 130 looks-up configuration preferences that correspond to the user and the page request in preferences store 180. Server 130 identifies corresponding configuration preferences, and retrieves configuration preferences 185 from preferences store 180. Client 100, server 130, preferences store 180, and configuration preferences 185 are the same as that shown in FIG. 1.

Server 130 uses configuration preferences 185 to customize the requested page of data. For example, the configuration preferences may include a tab preference and a scroll preference. In this example, server 130 selects the tab corresponding to the tab preference, scrolls the requested page to the scroll preference area, and stores the page of data as configured page 210. Server 130 then sends configured page 210 to client 100 for client 100's user to view (see FIG. 4 and corresponding text for further details regarding configuration preferences).

FIG. 2B is a diagram of a server receiving a page request and configuration preferences from a client, and sending a configured page to the client using the received configuration preferences. FIG. 2B is similar to FIG. 2A except that in FIG. 2B, server 130 receives configuration preferences 185 from client 100 instead of retrieving them from a local storage area. Client 100's user previously requested the same page of data whereby server 130 collected user event data, and sent configuration preferences 185 to client 100 to store in cookies 190 since server 130 and client 100 were not involved in a user session (see FIG. 1 and corresponding text for further details regarding configuration preferences storage details). Cookies 190 is the same as that shown in FIG. 1.

Figure 3:
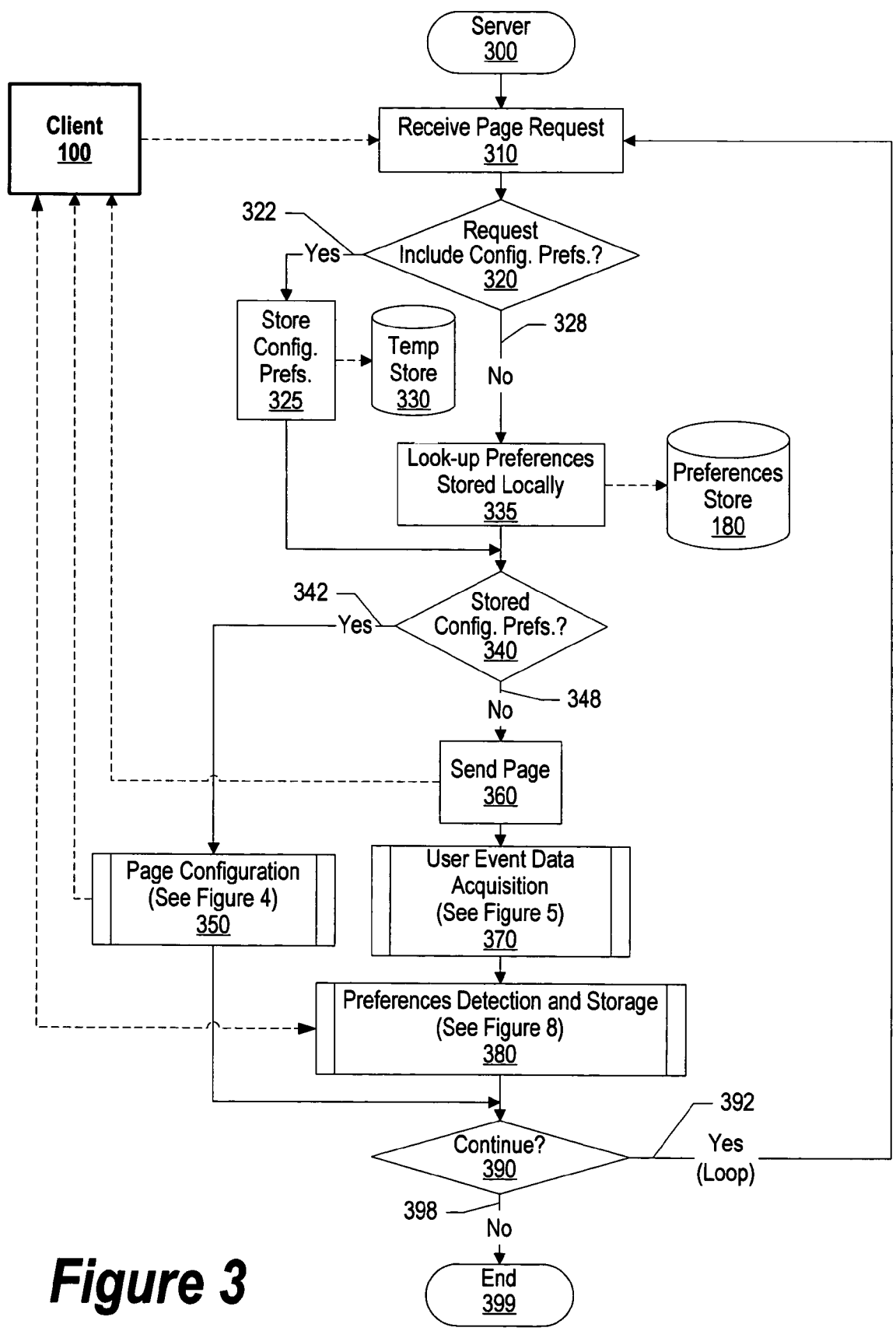
FIG. 3 is a high-level flowchart showing steps taken in a server acquiring non-invasive data and formatting a page based upon the non-invasive data.

FIG. 3 is a high-level flowchart showing steps taken in a server acquiring non-invasive data and formatting a page based upon the non-invasive data. Server processing commences at 300, whereupon processing receives a page request from client 100. For example, the page request may correspond to a web page in which the server manages. Client 100 is the same as that shown in FIG. 1.

A determination is made as to whether the page request includes configuration preferences (decision 310). For example, client 100 may have previously requested the same page that does not correspond to a user session, and the client's user scrolled down to a particular portion of the web page. In this example, since the web page does not correspond to a user session, the server may have sent configuration preferences to the client, at the user's approval, that include the location at which the user scrolled (see FIGS. 1, 2B, and corresponding text for further details regarding client side configuration preference storage details).

If the request includes configuration preferences, decision 320 branches to "Yes" branch 322 whereupon processing extracts the configuration preferences from the page request and stores the configuration preferences in temp store 330 (step 325). Temp store 330 may be stored on a nonvolatile storage area, such as a computer hard drive.

On the other hand, if the request does not include configuration preferences, decision 320 branches to "No" branch 328 whereupon processing looks-up configuration preferences in preferences store 180 at step 335. For example, client 100 may have previously requested the same page that corresponds to a user session, and the client's user selected a particular tab on the web page. In this example, since the web page corresponds to a user session, the server stores configuration preferences locally, at the user's approval, that includes the user's tab selection (see FIGS. 1, 2A, and corresponding text for further details regarding server-side configuration preference storage details). Preferences store 180 is the same as that shown in FIG. 1 and may be stored on a nonvolatile storage area, such as a computer hard drive.

A determination is made as to whether configuration preferences are stored, either in temp store 330 or preferences store 180, that correspond to client 100 and the requested page (decision 340). If configuration preferences do exist, decision 340 branches to "Yes" branch 342 whereupon processing configures the page using the stored configuration preferences (pre-defined process block 350, see FIG. 4 and corresponding text for further details).

On the other hand, if configuration preferences do not exist, decision 340 branches to "No" branch 348 whereupon processing sends the requested page, without customization, to client 100 at step 360. Processing then collects user event data from client 100 corresponding to the page of data, such as scrolling, tabbing, and button selection (pre-defined process block 370, see FIG. 5 and corresponding text for further details). Once processing collects user event data, processing uses the user event data to detect one or more user configuration preferences. For example, the user event data may signify that client 100's user scrolled to a particular section of a web page. In addition, processing sends a configuration preferences storage inquiry to client 100 that inquires whether client 100's user wishes for the server to store his configuration preferences (pre-defined process block 380, see FIG. 8 and corresponding text for further details.

A determination is made as to whether processing should continue (decision 390). If processing should continue, decision 390 branches to "Yes" branch 392 whereupon processing loops back to receive more page requests. This looping continues until processing should stop, at which point decision 390 branches to "No" branch 398 whereupon processing ends at 399.

Figure 4:
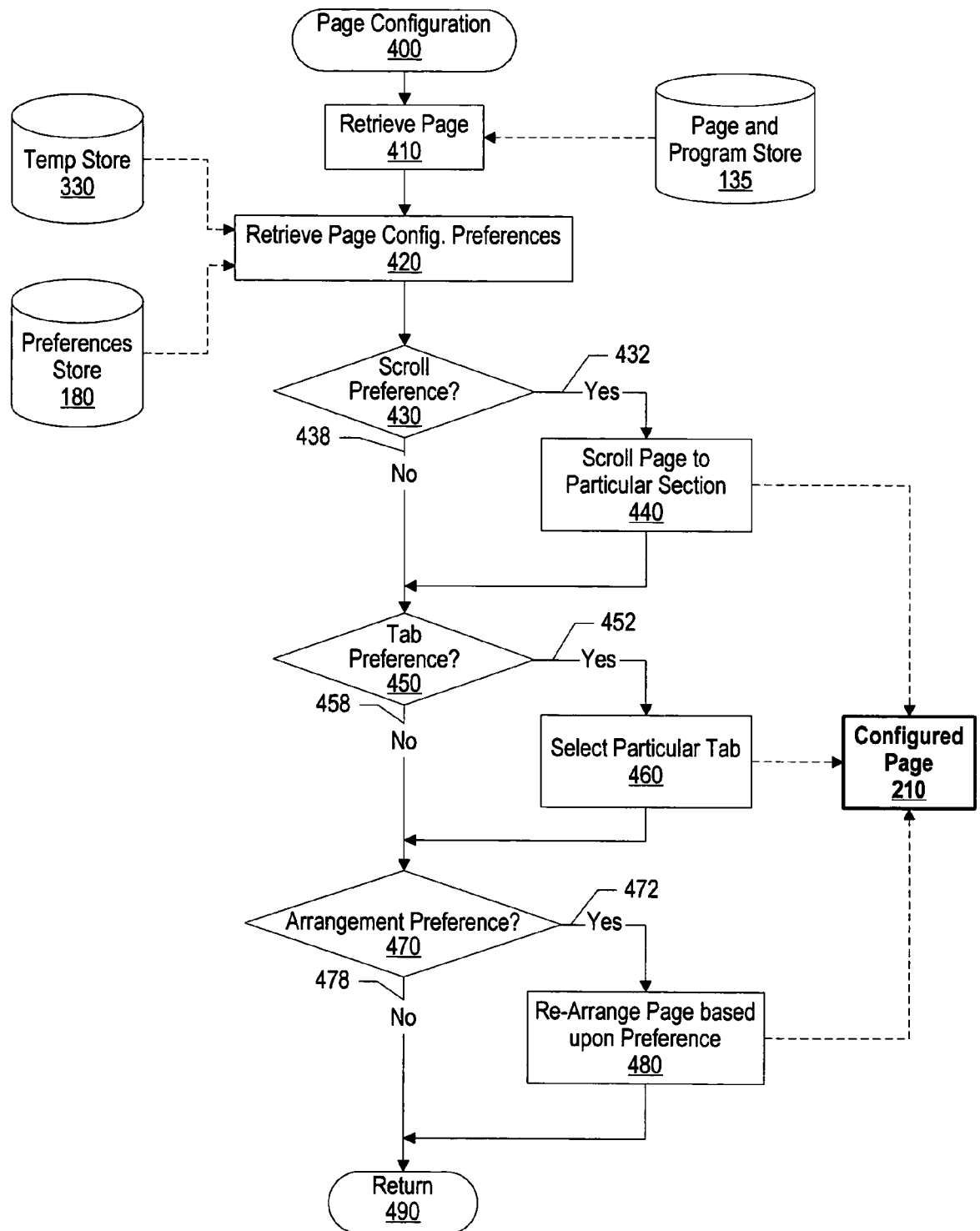
FIG. 4 is a flowchart showing steps taken in a server formatting a page of data based upon stored configuration preferences.

FIG. 4 is a flowchart showing steps taken in a server formatting a page of data based upon stored configuration preferences. Page configuration processing commences at 400, whereupon the server retrieves a page of data from page and program store 135 at step 410. For example, the page of data may be a sports web page. Page and program store 135 is the same as that shown in FIG. 1 and may be stored on a nonvolatile storage area, such as a computer hard drive.

Processing retrieves page configuration preferences, either from temp store 330 or preferences store 180, at step 420 based upon whether the configuration preferences were received from a client or whether the configuration preferences are stored locally at the server (see FIG. 3 and corresponding text for further details regarding configuration preferences locations). Temp store 330 and preferences store 180 are the same as that shown in FIG. 3 and FIG. 1, respectively. In one embodiment, configuration preferences that are received from a client may be stored on the same storage area as locally stored configuration preferences. In this embodiment, the server retrieves the configuration preferences from preferences store 180.

A determination is made as to whether the configuration preferences include a scroll preference (decision 430). For example, a user may have scrolled to a particular section of a sports web page, and chose to store his scrolling location as a configuration preference. If the configuration preferences include a scrolling preference, decision 430 branches to "Yes" branch 432 whereupon processing scrolls the retrieved page to an area corresponding to the configuration preference, and stores the new view as configured page 210. Configured page 210 is the same as that shown in FIGS. 2A and 2B. On the other hand, if the configuration preferences do not include a scrolling preference, decision 430 branches to "No" branch 438 whereupon processing bypasses scrolling steps.

A determination is made as to whether the configuration preferences include a tab preference (decision 450). For example, the user may have selected a tab on a sports web page that corresponds to his favorite team. In this example, the user may have chosen to have his tab selection stored as a configuration preference. If the configuration preferences include a tab preference, decision 450 branches to "Yes" branch 452 whereupon processing selects the tab on configured page 210 that corresponds to the tab preference. On the other hand, if the configuration preference does not include a tab preference, decision 450 branches to "No" branch 458 bypassing tab selection steps.

A determination is made as to whether the configuration preferences include an arrangement preference (decision 470). For example, the user may have selected a button on a financial web site that corresponds to a mortgage calculator. In this example, the user may have chosen to have the selected button moved to the top of the web page since the user plans to return to the web page and frequently use the mortgage calculator. If the configuration preferences include an arrangement preference, decision 470 branches to "Yes" branch 472 whereupon processing arranges configured page 210 corresponding to the arrangement preference. On the other hand, if the configuration preferences do not include an arrangement preference, decision 470 branches to "No" branch 478 bypassing tab selection steps. Processing returns at 490.

Figure 5:
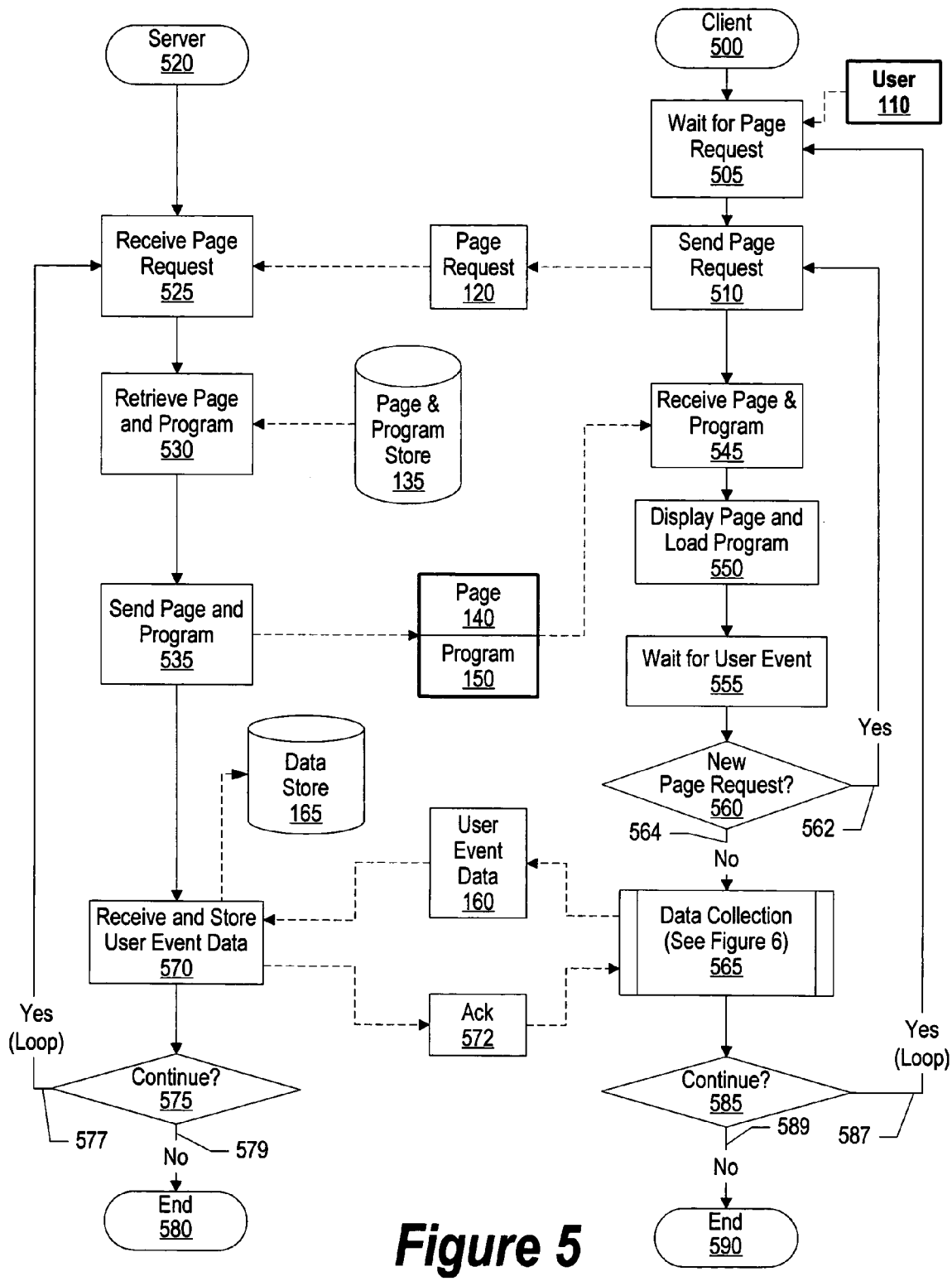
FIG. 5 is a flowchart showing steps taken in a server sending a web page to a client, the client collecting data corresponding to a user event, and the client sending the user event data to the server.

FIG. 5 is a flowchart showing steps taken in a server sending a web page to a client, the client collecting data corresponding to a user event, and the client sending the user event data to the server. Client processing commences at 500, whereupon the client waits for a page request from user 110 (step 505). For example, user 110 may enter a URL location to view a particular web page. When the client receives the page request from user 502, the client sends page request 120 to a server at step 510.

Server processing commences at 520, whereupon the server receives page request 120 at step 525. The server retrieves the requested page and a corresponding data collector program from page and program store 135 at step 530. Page and program store 135, user 110, and page request 120 are the same as that shown in FIG. 1.

The server sends page 140 and program 150 to the client at step 535, and the client receives page 140 and program 150 at step 545. The client displays the request page on the client's display and loads the collector program (step 550). The client waits for a user event at step 555, such as user 110 moving his pointing device. When the client detects a user event, a determination is made as to whether the user event is requesting a new web page (decision 560). For example, the user may select a hyperlink on the displayed web page that points to a second web page. If the user event is a new page request, decision 560 branches to "Yes" branch 562 which loops back to send and process a new page request. This looping continues until the client detects a user event that is not a new page request, at which point decision 560 branches to "No" branch 564 whereupon the client collects user event data corresponding to the user event, and sends user event data 160 to the server (pre-defined process block 565 see FIG. 6 and corresponding text for further details regarding data collection).

The server receives user event data 160, stores the data in data store 165, and may send an acknowledgement message (e.g. acknowledgement 572) to the client indicating that the server received user event data 160 (step 570). User event data 160 and data store 165 are the same as that shown in FIG. 1. A determination is made as to whether the server should continue processing (decision 575). If the server should continue processing, decision 575 branches to "Yes" branch 577 which loops back to receive more page requests. This looping continues until the server stops processing, at which point decision 575 branches to "No" branch 579 whereupon server processing ends at 580.

The client receives acknowledgement 572 which informs the client that the server received the user event data. If the client did not receive acknowledgement 572 within a particular timeframe, the client may re-send user event data 160 to the server until the client receives an acknowledgement message from the server. A determination is made as to whether the client should continue processing (decision 585). If the client should continue processing, decision 585 branches to "Yes" branch 587 which loops back to process more user requests. This looping continues until client processing should stop, at which point decision 585 branches to "No" branch 589 whereupon client processing ends at 590.

Figure 6:
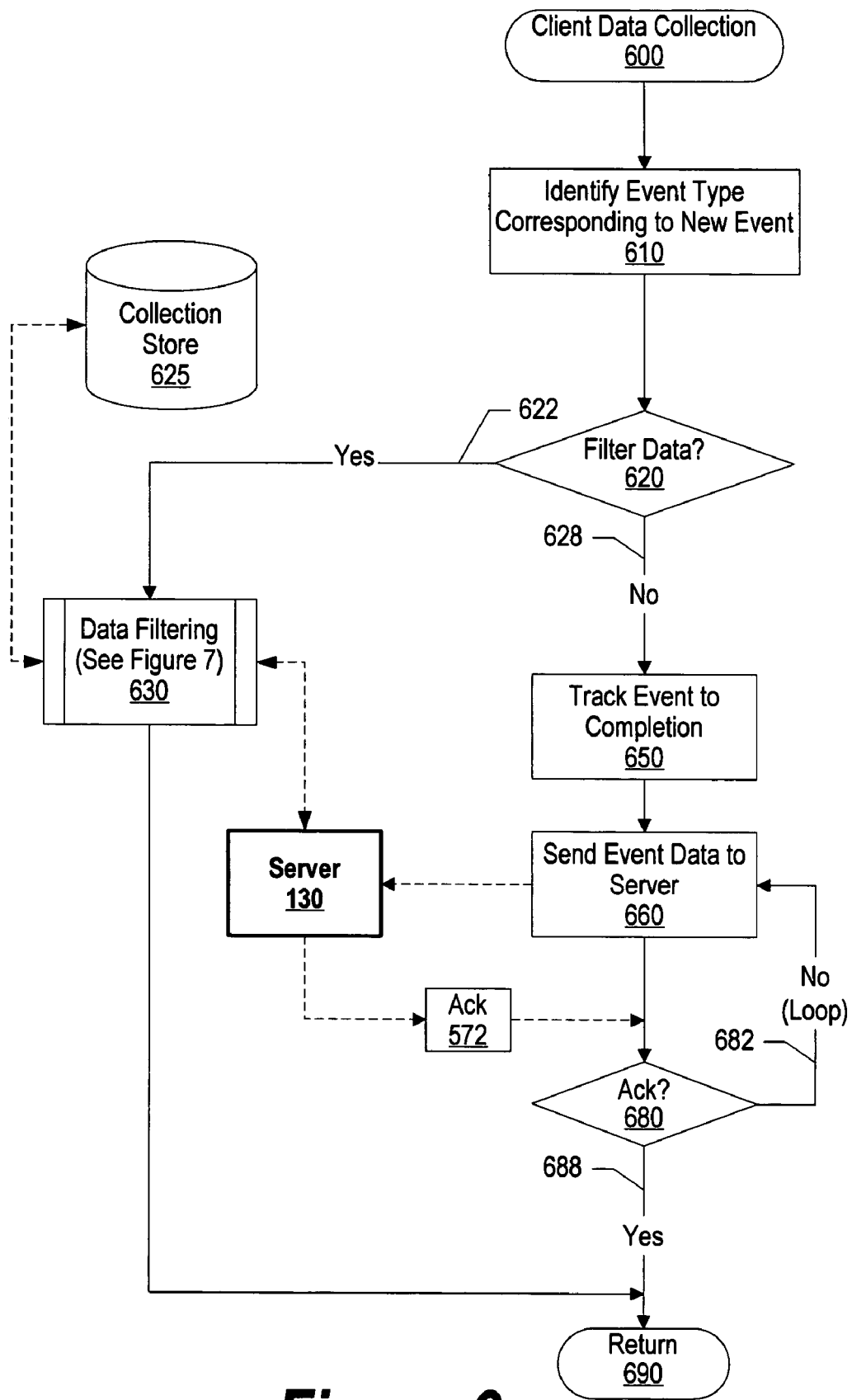
FIG. 6 is a flowchart showing steps taken in a client non-invasively collecting user event data.

FIG. 6 is a flowchart showing steps taken in a client non-invasively collecting user event data. Processing commences at 600, whereupon the client identifies an event type corresponding to a newly detected event (step 610). For example, a user may have moved his mouse into a region, such as "Region 1", whereby processing identifies the event type as "Region 1 mouseover".

A determination is made as to whether processing should filter the user event data (decision 620). Using the example described above, processing may be configured such that the client should send region 1 user event data to the server once per session. In this example, processing sends region 1 user event data the first time a user's pointing device enters region 1, and then filters out (i.e. doesn't send) subsequent region 1 user event data.

Figure 7:
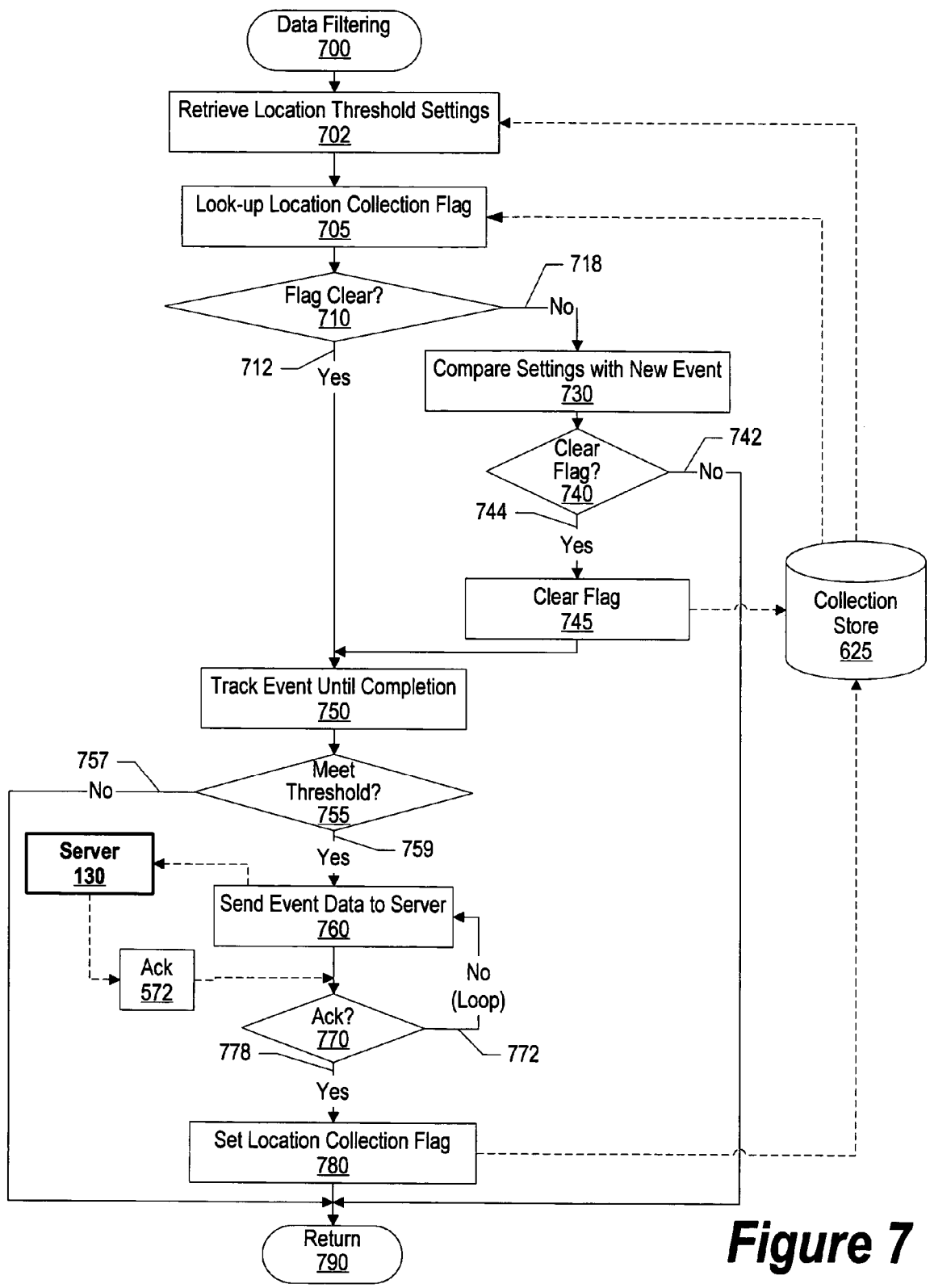
FIG. 7 is a flowchart showing steps taken in a client filtering user event data.

If processing should filter the user event data, decision 620 branches to "Yes" branch 622 whereupon the user event data is filtered using collection threshold settings that are retrieved from collection store 625 (pre-defined process block 630, see FIG. 7 and corresponding text for further details). Collection store 625 may be stored on a non-volatile storage area, such as a computer hard drive.

On the other hand, if processing should not filter the user event data and should send data to the server corresponding to each user event, processing branches to "No" branch 628 whereupon processing tracks the user event until completion (step 650). For example, processing may track the amount of time that a user places his mouse in a particular region. Once the user event is completed (i.e. the mouse is moved out of a region), processing sends the user event data to server 130 (step 660). Server 130 is the same as that shown in FIG. 1. If server 130 receives the data intact, server 130 sends acknowledgement 572 to the client. Acknowledgement 572 is the same as that shown in FIG. 5. On the other hand, if server 130 did not receive the data intact, server 130 may not send a response, or server 130 may send an error message to the client that indicates that the user event data included errors.

A determination is made as to whether the client received an acknowledgment message from server 130 (decision 680). If the client did not receive an acknowledgement message, decision 680 branches to "No" branch 682 which loops back to re-send the user event data. This looping continues until the client receives an acknowledgement message, at which point decision 680 branches to "Yes" branch 688 whereupon processing returns at 690. In one embodiment, processing may be configured to limit the number of attempts to send the user event data to the server, such as five attempts. In this embodiment, the client sends the user event data to the server a maximum of five times.

FIG. 7 is a flowchart showing steps taken in a client filtering user event data. For example, processing may be configured such that the client should capture user event data corresponding to a particular event one time per session and then filter out (i.e. do not capture) subsequent user event data for the particular event during the remaining session.

Processing commences at 700, whereupon processing retrieves collection threshold settings corresponding to the user event from collection store 625 (step 702). Collection threshold settings include settings that are configured to filter user event data. For example, a vendor may wish to set an out-of-region threshold, such as ten seconds, for a region-on his web page such that once user event data is collected for the region, user events are not tracked for another ten seconds. Collection store 625 is the same as that shown in FIG. 6.

Processing looks-up a location collection flag in collection store 625 (step 705). The location collection flag corresponds to a particular user event and identifies whether the event has occurred. For example, if the user event is a "mouse in region 1" event, processing retrieves the location collection flag that corresponds to a "mouse in region 1" event. A determination is made as to whether the location collection flag is cleared (decision 710). If the location collection flag is clear, decision 710 branches to "Yes" branch 712 whereupon processing tracks the user event at step 750.

On the other hand, if the flag is set, decision 710 branches to "No" branch 718 whereupon processing performs steps to identify whether to collect user event data based upon the last occurrence of the user event and the collection threshold settings. Processing compares the collection threshold settings with the user event's properties at step 730. Using the example described above, processing identifies the time that the new region 1 mouseover event occurs, identifies when location collection flag was last set, and compares the difference in time with the collection threshold settings.

A determination is made as to whether to clear the collection threshold settings based on the comparison performed in step 730 (decision 740). If processing should clear the location collection flag, decision 740 branches to "Yes" branch 744 whereupon processing clears the location collection flag (step 745) and tracks the user event at step 750. Using the example described above, the location collection flag may have been set twenty seconds prior to the current user event. In this example, processing clears the location collection flag since the time between the two user events is longer than the corresponding collection threshold settings. On the other hand, if processing should not clear the location collection flag, decision 740 branches to "No" branch 742 bypassing location collection flag clearing steps, and returning at 790.

Processing tracks the user event until completion at step 750. Using the example described above, processing tracks the "mouse in region 1" event until the user moves his pointing device out of region 1. A determination is made as to whether the user event meets collection threshold settings (decision 755). For example, an "in-region" collection threshold setting may be configured to require a user's pointing device to be in a particular region for a minimum amount of time in order to consider the user event valid, such as ten seconds. If the user event data does not meet collection threshold settings, decision 755 branches to "No" branch 757 bypassing user event data sending steps.

On the other hand, if the user event data meets collection threshold settings, decision 755 branches to "Yes" branch 759 whereupon processing sends the user event data to server 130 (step 760). If server 130 receives the user event data intact, server 130 sends acknowledgement 572 to the client. Server 130 and acknowledgement 572 are the same as that shown in FIG. 1 and FIG. 5, respectively. On the other hand, if server 130 did not receive the user event data intact, server 130 may not send a response, or server 130 may send an error message to the client that indicates that the user event data included errors.

A determination is made as to whether the client received an acknowledgment message from server 130 (decision 770). If the client did not receive an acknowledgement message, decision 770 branches to "No" branch 772 which loops back to resend the user event data. This looping continues until the client receives an acknowledgement message, at which point decision 770 branches to "Yes" branch 778 whereupon processing sets the location collection flag at step 780, and processing returns at 790.

In one embodiment, processing may be configured to limit the number of attempts to send the user event data to the server, such as five attempts. In this embodiment, the client sends the user event data to the server a maximum of five times.

Figure 8:
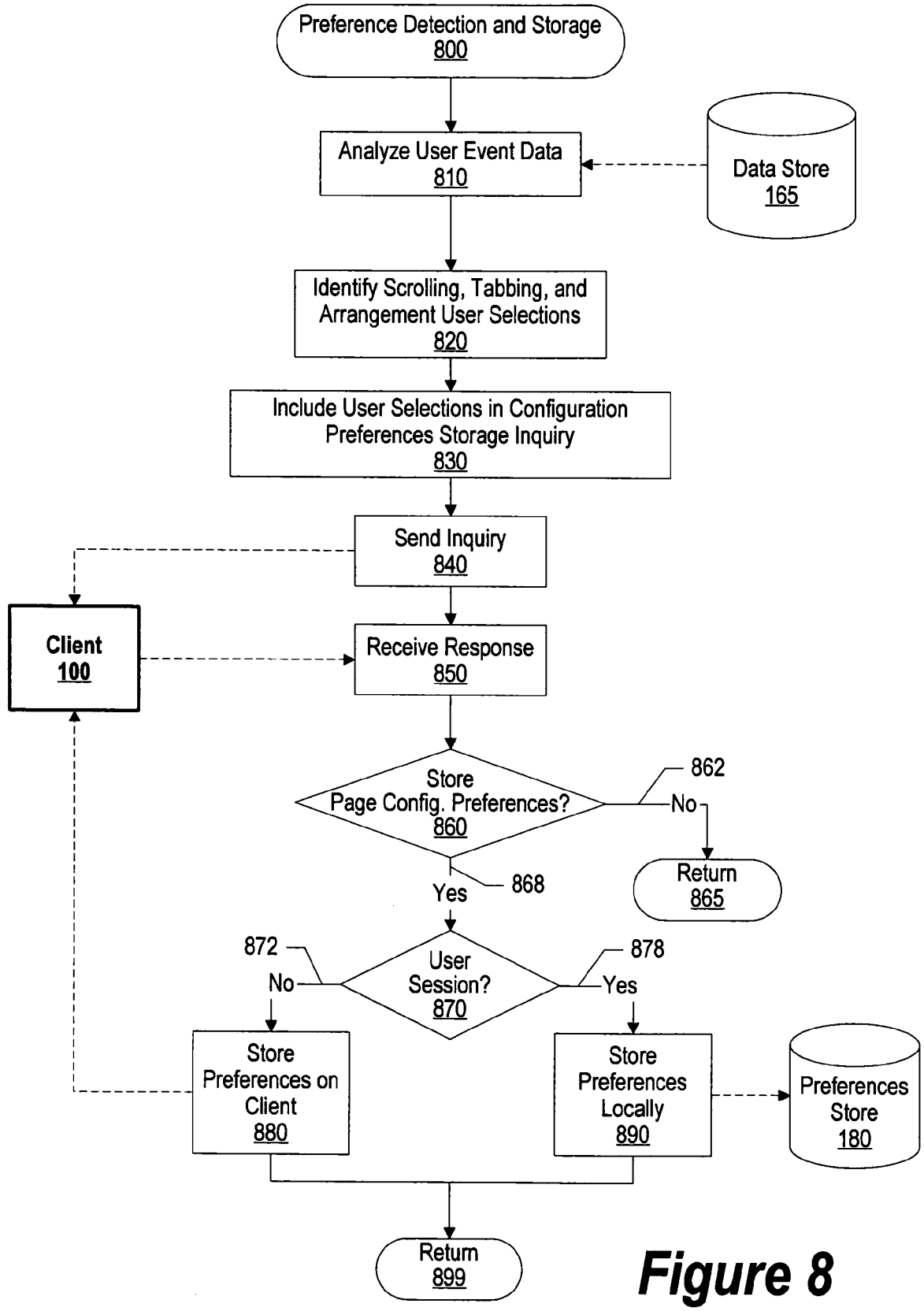
FIG. 8 is a flowchart showing steps taken in a server identifying and storing a user's configuration preferences.

FIG. 8 is a flowchart showing steps taken in a server identifying and storing a user's configuration preferences. Preference detection and storage processing commences at 800, whereupon processing analyzes user event data that is stored in data store 165 at step 810. User event data was non-invasively collected from a client and corresponds to a particular web page (see FIGS. 5, 6, 7, and corresponding text for further details regarding user event data collection). Data store 165 is the same as that shown in FIG. 1.

Processing identifies scrolling, tabbing, and arrangement user selections using the user event data at step 820. For example, the user event data may include a tab selection that a user selected on the particular web page. Processing includes the user selections in a configuration preferences storage inquiry to be sent to a user (step 830). For example, the configuration preferences storage inquiry may include the question "Would you like us to re-arrange the tab order of the panes/layers you are viewing so that the second pane is the first one visible?" In another example, where a user scrolls to a particular section of a web page, the configuration preferences storage inquiry may include the question "Would you like us to remember your scrolling preference so that your selected area is automatically displayed after every page request?"

Processing sends the configuration preferences storage inquiry to client 100 at step 840. The client's user responds to the inquiry, and the server receives the storage response from client 100 at step 850. Client 100 is the same as that shown in FIG. 1. A determination is made as to whether client 100's user wishes to store the configuration preferences (decision 860). If client 100's user does not wish to store the configuration preferences, decision 860 branches to "No" branch 862 whereupon processing returns at 865.

On the other hand, if client 100's user wishes to store the configuration preferences, decision 860 branches to "Yes" branch 868 whereupon a determination is made as to whether client 100 is in a user session with the server (decision 870). For example, client 100's user may have logged into a sports website using a user id and a password. In this example, the server is able to identify the user the next time the user logs into the website and retrieve configuration preferences from the server's local storage area. If client 100 is in a user session with the server, decision 870 branches to "Yes" branch 878 whereupon the server stores the configuration preferences on a local storage area, such as preferences store 180. Preferences store 180 is the same as that shown in FIG. 1 and may be stored on a nonvolatile storage area, such as a computer hard drive. Processing returns at 899.

On the other hand, if client 100 is not in a user session with the server, and, therefore, the server does not have a way to identify client 100's user, decision 870 branches to "No" branch 872 whereupon the server sends the configuration preferences to client 100 for client 100 to store in a storage area, such as a cookie (step 880). Processing returns at 899.

Figure 9:
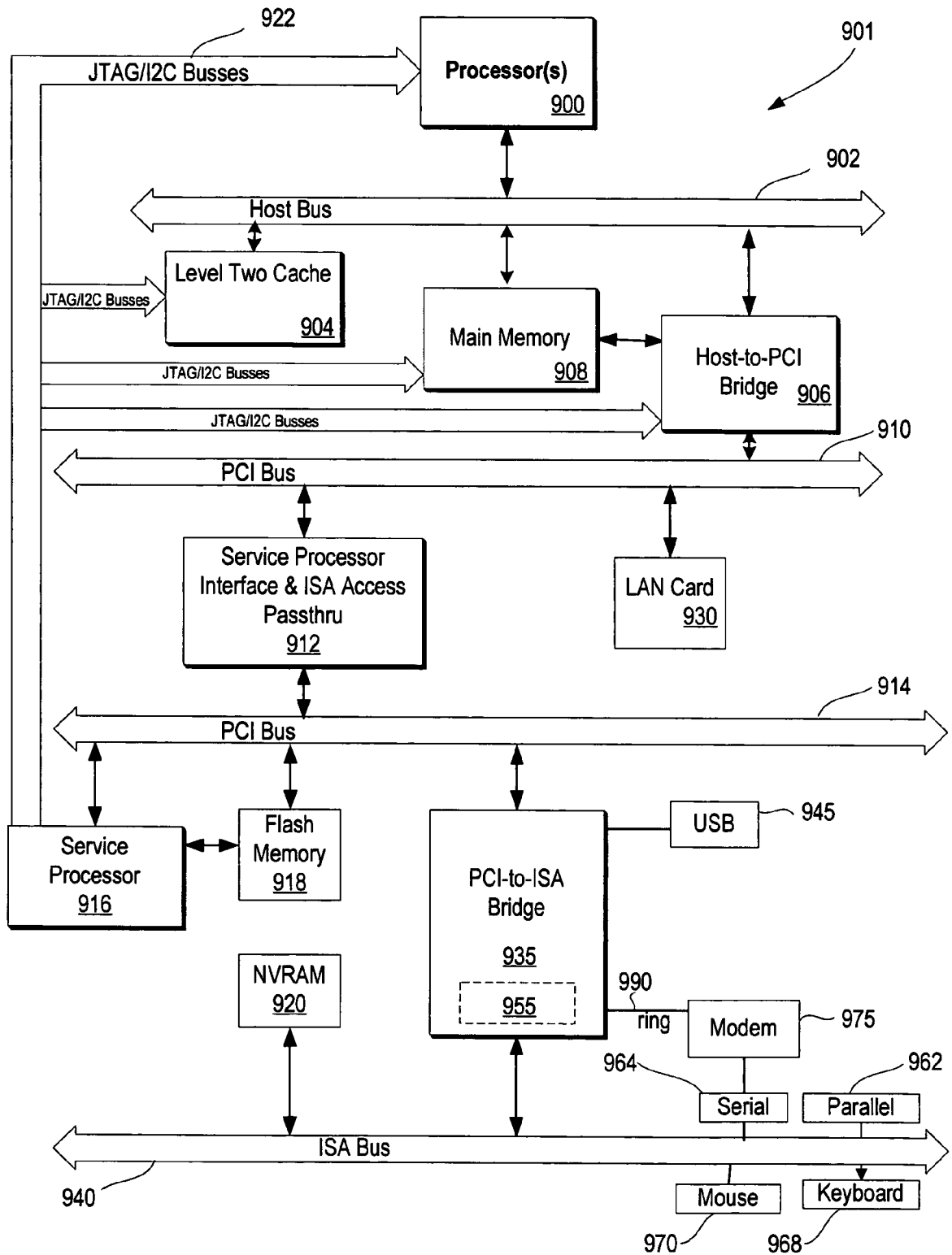
FIG. 9 is a block diagram of an information handling system capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    receiving a page request from a user's client, the page request corresponding to a page of data;
    retrieving the page of data and a data collector program;
    sending the page of data and the data collector program to the user's client;
    receiving user event data corresponding to the page of data, the user event data non-invasively collected at the user's client using the data collector program;
    identifying one or more configuration preferences based upon the user event data;
    sending a storage inquiry to the user, the storage inquiry corresponding to the configuration preferences;
    receiving a storage response, the storage response corresponding to the storage inquiry;
    determining whether a user session corresponds to the user's client;
    in response to determining that the user session corresponds to the user's client, sending the configuration preferences to the user's client, wherein the user's client is adapted to store the configuration preferences in a client storage area; and
    in response to determining that the user session does not correspond to the user's client, storing the configuration preferences in a local storage area.

2. The method of claim 1 further comprising:
    receiving a subsequent page request;
    determining whether the configuration preferences correspond to the subsequent page request;
    retrieving the configuration preferences in response to determining that the configuration preferences correspond to the subsequent page request;
    configuring the page of data corresponding to the configuration preferences; and
    sending the configured page of data to the user.

3. The method of claim 2 wherein the page request includes the configuration preferences.

4. The method of claim 1 wherein at least one of the configuration preferences is selected from the group consisting of a scroll preference, a tab preference, and an arrangement preference.

5. An information handling system comprising:
    one or more processors;
    a memory accessible by the processors;
    one or more nonvolatile storage devices accessible by the processors; and
    a page configuration tool for configuring a page of data, the page configuration tool comprising software code executing on a computer to:
        receive a page request from a users client, the page request corresponding to a page of data;
        retrieve the page of data and a data collector program from one of the nonvolatile storage devices;
        send the page of data and the data collector program to the user's client over a computer network;
        receive user event data corresponding to the page of data over a computer network, the user event data non-invasively collected at the user's client using the data collector program;
        identify one or more configuration preferences based upon the user event data;
        send a storage inquiry to the user's client over the computer network, the storage inquiry corresponding to the configuration preferences;
        receive a storage response from the user's client, the storage response corresponding to the storage inquiry; and
        determine whether a user session corresponds to the user's client;
        in response to determining that the user session corresponds to the user's client,
            send the configuration preferences to the user's client over the computer network, wherein the user's client is adapted to store the configuration preferences in a client storage area; and
        in response to determining that the user session does not correspond to the user's client,
            store the configuration preferences in one of the nonvolatile storage areas.

6. The information handling system of claim 5 wherein the software code is further executing on a computer to:
    receive a subsequent page request from the user's client over the computer network;
    determine whether the configuration preferences correspond to the subsequent page request;
    retrieve the configuration preferences from one of the nonvolatile storage devices in response to determining that the configuration preferences correspond to the subsequent page request;
    configure the page of data corresponding to the configuration preferences; and
    send the configured page of data to the user's client over the computer network.

7. The information handling system of claim 6 wherein the page request includes the configuration preferences.

8. A computer program product stored in a computer storage medium, the computer storage medium containing instructions for execution by a computer, which when executed by the computer, cause the computer to implement a method comprising:
    receiving a page request from a user's client, the page request corresponding to a page of data;
    retrieving the page of data and a data collector program;
    sending the page of data and the data collector program to the user's client;
    receiving user event data corresponding to the page of data, the user event data non-invasively collected at the user's client using the data collector program;
    identifying one or more configuration preferences based upon the user event data;
    sending a storage inquiry to the user, the storage inquiry corresponding to the configuration preferences;
    receiving a storage response, the storage response corresponding to the storage inquiry;
    determining whether a user session corresponds to the user's client;
    in response to determining that the user session corresponds to the user's client,
        sending the configuration preferences to the user's client, wherein the user's client is adapted to store the configuration preferences in a client storage area; and, in response to determining that the user session does not correspond to the user's client,
     storing the configuration preferences in a local storage area.

9. The program product of claim 8 wherein the method further comprises:
   receiving a subsequent page request;
   determining whether the configuration preferences correspond to the subsequent page request;
   retrieving the configuration preferences in response to determining that the configuration preferences correspond to the subsequent page request;
   configuring the page of data corresponding to the configuration preferences; and
   sending the configured page of data to the user.

10. The program product of claim 9 wherein the page request includes the configuration preferences.

11. The program product of claim 8 wherein at least one of the configuration preferences is selected from the group consisting of a scroll preference, a tab preference, and an arrangement preference.

12. A method comprising:
    receiving user event data, wherein the user event data is non-invasively collected at a user's client using a data collector program, the user event data corresponding to a user and a page of data;
    identifying one or more configuration preferences based upon the user event data;
    sending a storage inquiry to the user, the storage inquiry corresponding to the configuration preferences;
    receiving a storage response, the storage response corresponding to the storage inquiry;
    determining whether a user session corresponds to the user's client;
    in response to determining that the user session corresponds to the user's client, sending the configuration preferences to the user's client, wherein the user's client is adapted to store the configuration preferences in a client storage area; and
    in response to determining that the user session does not correspond to the user's client, storing the configuration preferences in a local storage area;
    receiving a page request;
    determining whether the configuration preferences correspond to the page request;
    retrieving the configuration preferences in response to the determination;
    configuring the page of data corresponding to the configuration preferences; and
    sending the configured page of data to the user.

13. An information handling system comprising:
    one or more processors;
    a memory accessible by the processors;
    one or more nonvolatile storage devices accessible by the processors; and
    a page configuration tool for configuring a page of data, the page configuration tool comprising software code executing on a computer to:
      receive user event data from a user's client over a computer network, wherein the user event data is non-invasively collected at the user's client using a data collector program, the user event data corresponding to a user and a page of data;
      identify one or more configuration preferences based upon the user event data;
      send a storage inquiry to the user over the computer network, the storage inquiry corresponding to the configuration preferences;
      receive a storage response from the user's client over the computer network, the storage response corresponding to the storage inquiry;
      determine whether a user session corresponds to the user's client;
      in response to determining that the user session corresponds to the user's client,
      send the configuration preferences to the user's client over the computer network, wherein the user's client is adapted to store the configuration preferences in a client storage area; and
      in response to determining that the user session does not correspond to the user's client,
      store the configuration preferences in one of the nonvolatile storage areas;
    nonvolatile storage devices based upon the storage response;
    receive a page request from the user's client over the computer network;
    determine whether the configuration preferences correspond to the page request;
    retrieve the configuration preferences from one of the nonvolatile storage devices in response to the determination;
    configure the page of data corresponding to the configuration preferences;
    send the configured page of data to the user's client over the computer network.

14. A computer program product stored in a computer storage medium, the computer storage medium containing instructions for execution by a computer, which when executed by the computer, cause the computer to implement a method comprising:
    receiving user event data, wherein the user event data is non-invasively collected at a user's client using a data collector program, the user event data corresponding to a user and a page of data;
    identifying one or more configuration preferences based upon the user event data;
    sending a storage inquiry to the user, the storage inquiry corresponding to the configuration preferences;
    receiving a storage response, the storage response corresponding to the storage inquiry;
    determining whether a user session corresponds to the user's client;
    in response to determining that the user session corresponds to the user's client,
      sending the configuration preferences to the user's client, wherein the user's client is adapted to store the configuration preferences in a client storage area; and
    in response to determining that the user session does not correspond to the user's client,
      storing the configuration preferences in a local storage area;
    receiving a page request;
    determining whether the configuration preferences correspond to the page request;
    retrieving the configuration preferences in response to the determination;
    configuring the page of data corresponding to the configuration preferences; and
    sending the configured page of data to the user.

* * * * *